(12) United States Patent
Schaffner et al.

(10) Patent No.: US 9,026,331 B2
(45) Date of Patent: May 5, 2015

(54) MONOTONIC COUPLING ASSEMBLY ENGAGEMENT

(71) Applicant: WPT Power Corporation, Wichita Falls, TX (US)

(72) Inventors: Bryan D. Schaffner, Wichita Falls, TX (US); John G. Boland, Wichita Falls, TX (US)

(73) Assignee: WPT Power Corporation, Wichita Falls, TX (US)

( * ) Notice: Subject to any disclaimer, the term of this patent is extended or adjusted under 35 U.S.C. 154(b) by 140 days.

(21) Appl. No.: 13/782,727

(22) Filed: Mar. 1, 2013

(65) Prior Publication Data
US 2014/0249728 A1    Sep. 4, 2014

(51) Int. Cl.
*G06F 15/00* (2006.01)
*F16D 48/06* (2006.01)

(52) U.S. Cl.
CPC .................................. *F16D 48/06* (2013.01)

(58) Field of Classification Search
None
See application file for complete search history.

(56) References Cited

U.S. PATENT DOCUMENTS

| 4,591,038 | A  | 5/1986  | Asagi et al.   |
| 5,360,381 | A  | 11/1994 | Swist          |
| 6,557,687 | B1 | 5/2003  | Herchick       |
| 8,066,619 | B2 | 11/2011 | Herchick et al.|

FOREIGN PATENT DOCUMENTS

| EP | 0423799 A2   | 4/1991  |
| JP | 2000337406 A | 12/2000 |
| WO | 2009022450 A1| 2/2009  |

OTHER PUBLICATIONS

International Search Report and Written Opinion dated Jun. 18, 2014 for Application No. PCT/US2014/017666.

*Primary Examiner* — Thomas Tarcza
*Assistant Examiner* — Garrett Evans
(74) *Attorney, Agent, or Firm* — Peter V. Schroeder

(57) ABSTRACT

A system, computer-implemented method, and computer program product are provided for a monotonic coupling assembly engagement. A coupling assembly actuation force output is increased to a coupling assembly associated with a rotary power source and a piece of driven equipment. A determination is made whether a power source process variable associated with the rotary power source drops below a pause threshold. A current coupling assembly actuation force output is maintained to the coupling assembly in response to a determination that the power source process variable drops below the pause threshold. A determination is made whether the power source process variable rises above a resume threshold. The coupling assembly actuation force output is increased to the coupling assembly in response to a determination that the power source process variable rises above the resume threshold.

20 Claims, 5 Drawing Sheets

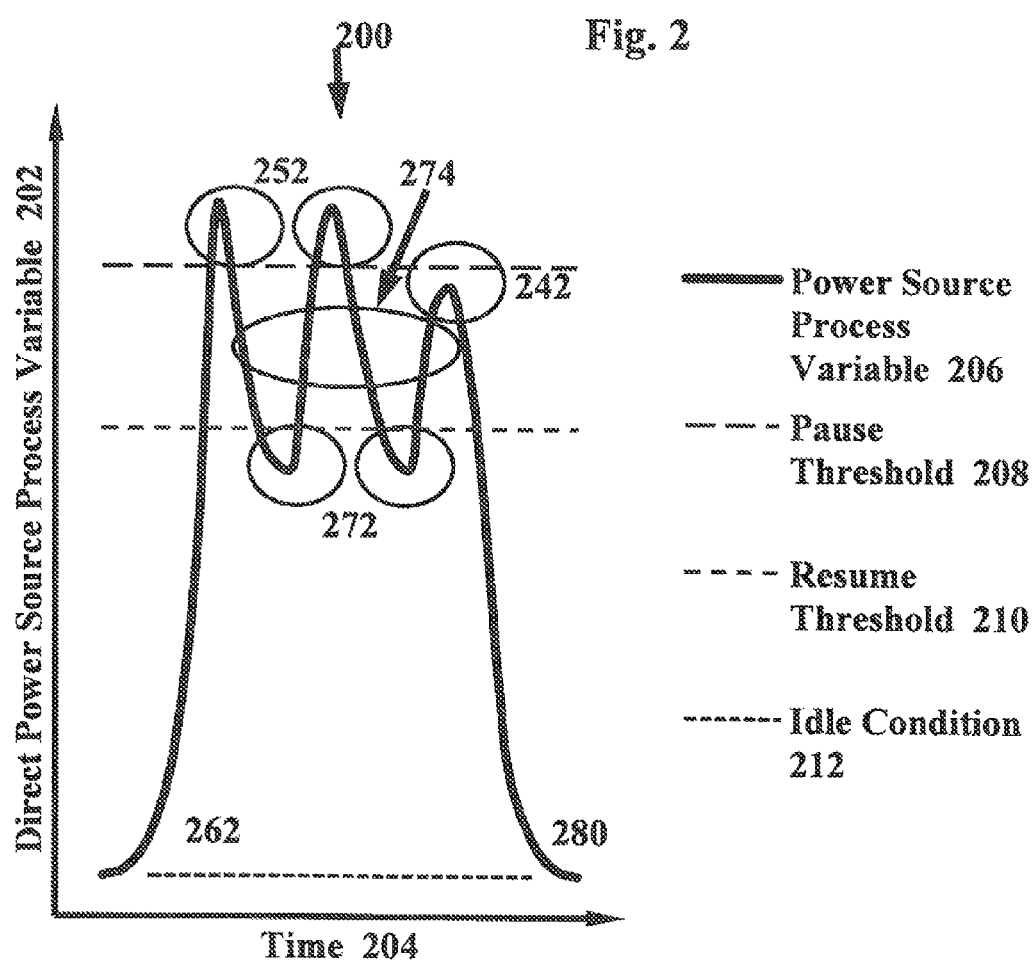

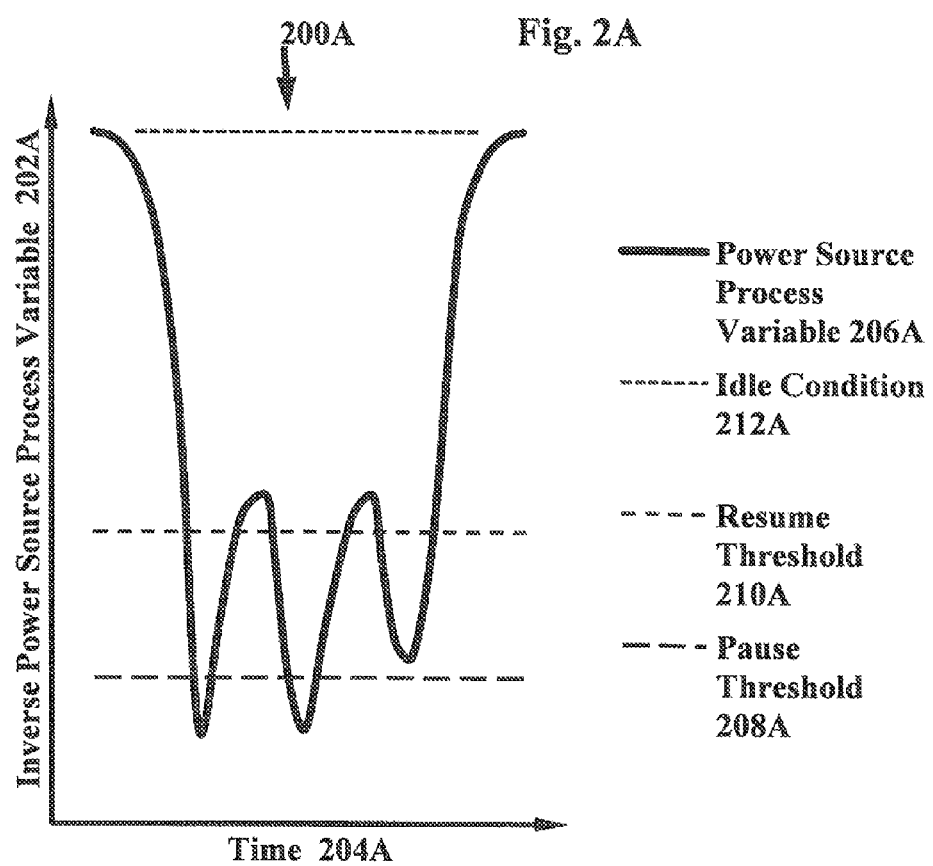

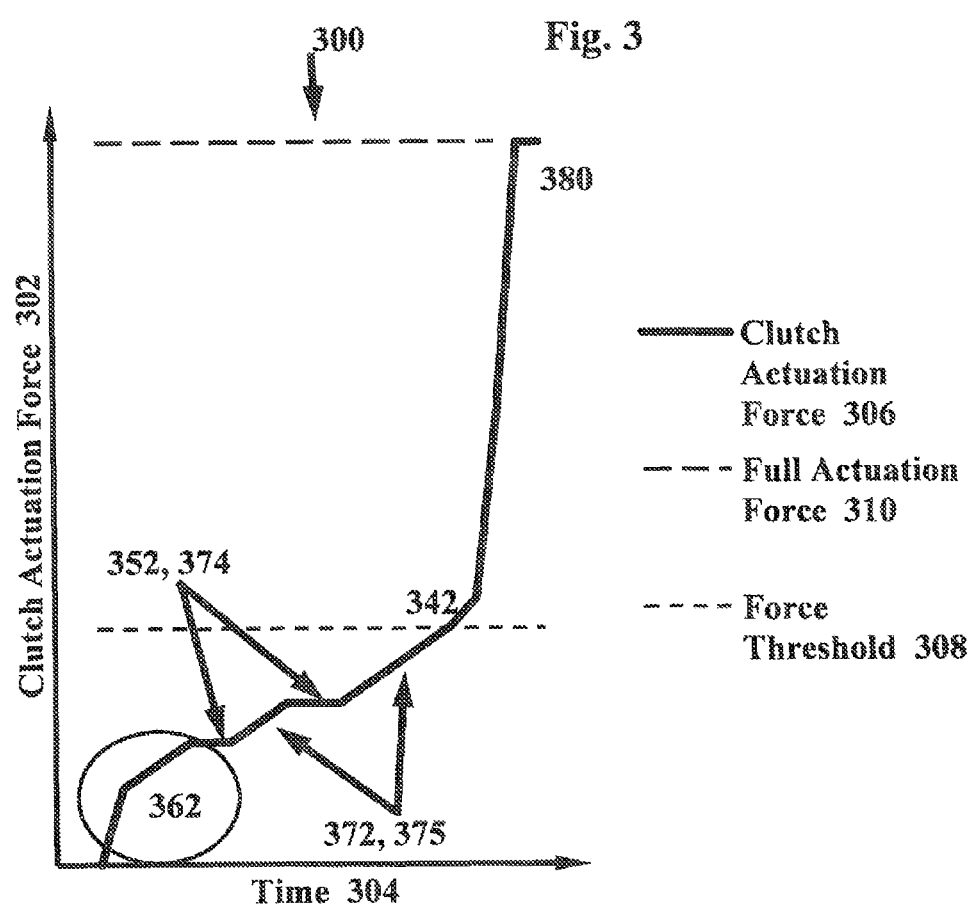

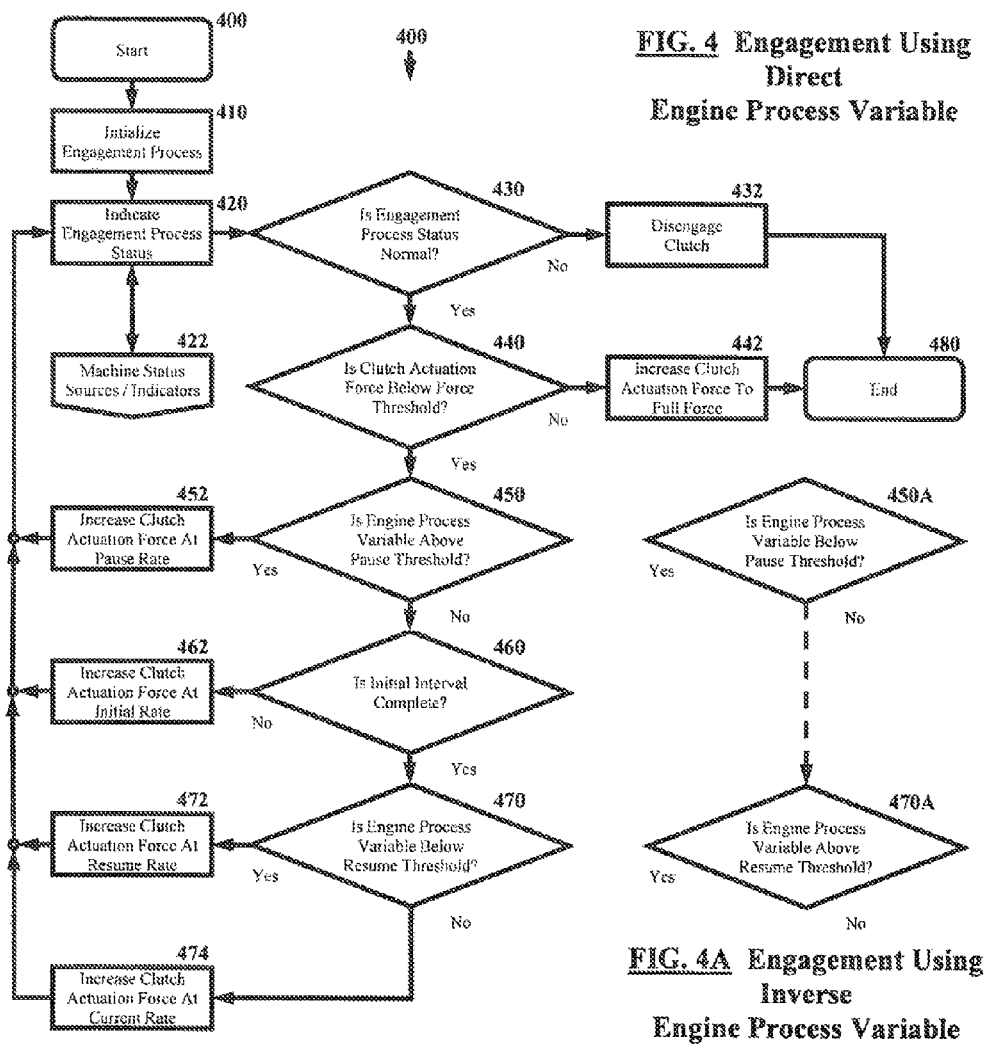

MONOTONIC COUPLING ASSEMBLY ENGAGEMENT

CROSS REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

FIELD OF THE PRESENT DISCLOSURE

The embodiments of the present disclosure relate generally to power transmission control, and more specifically to a system, computer program product, and computer-implemented method for a monotonic coupling assembly engagement.

BACKGROUND

A coupling assembly with an associated control system, such as a clutch with an associated clutch control system, is interposed between a rotary power source, such as an engine, and a piece of driven equipment. The coupling assembly control system may include input and/or output process variable sensors for the rotary power source and/or the driven equipment. A manual coupling assembly engagement procedure with high inertia driven equipment is particularly difficult for typical operators, because a rotary power source operating at idle speed is weak and unstable until the rotary power source is in a power-producing state. Skilled operators may unconsciously bring a rotary power source to a power-producing state and maintain the rotary power source in the power-producing state, while engaging the coupling assembly to accelerate the load from a static condition. "Bump starting" is a procedure by which a rotary power source is loaded in excess of its current power capability and quickly relieved to keep the rotary power source running. The excess load is then repeatedly applied and relieved until the output speed of the coupling assembly is equal to the input speed of the coupling assembly. The "bump starting" procedure causes the rotary power source to greatly increase power output, followed by a return to a low power-producing state, in rapid succession. These dramatic changes in rotary power source power are quite audible. Erratic behavior of the rotary power source's exhaust flap is another noticeable indicator of a rotary power source's power fluctuation during a "bump starting" procedure. Accordingly, it is desirable to provide improved systems, computer program products, and computer-implemented methods for coupling assembly engagement.

SUMMARY

A system, computer program product, and computer-implemented method are provided for a monotonic coupling assembly engagement. A computer executes a computer program in a memory to increase a coupling assembly actuation force to a coupling assembly interposed between a rotary power source and a piece of driven equipment. The increase in the coupling assembly actuation force applies a light load to the rotary power source, causing the rotary power source to bog (slow down) during the beginning of the coupling assembly engagement process. The computer program determines whether a power source process variable, such as the engine speed, drops below a first threshold value, called a pause threshold. If the power source process variable drops too far below the pause threshold, the rotary power source may be on the verge of stalling, so the computer program maintains the current coupling assembly actuation force to the coupling assembly. By stopping the increase in the coupling assembly actuation force output, the computer program gives the rotary power source an opportunity to recover from the increased load caused by the increased coupling assembly actuation force output. As the rotary power source bogs, its computer will increase the fuel flow, thereby increasing the rotary power source speed in an attempt to return the rotary power source to idle speed. Then the computer program determines whether the power source process variable rises above a resume threshold, which would indicate that the rotary power source speed is increasing, such that the rotary power source is no longer in danger of stalling. If the power source process variable rises above the resume threshold, the computer program increases the coupling assembly actuation force output to the coupling assembly, which may continue increasing until a coupling assembly pressure rises to a force threshold, such as the maximum coupling assembly pressure. Embodiments of the present disclosure enable a reliable coupling assembly engagement without the erratic behavior and the damage inherent in the "bump starting" procedure.

BRIEF DESCRIPTION OF THE DRAWINGS

Drawings of the preferred embodiments of the present disclosure are attached hereto so that the embodiments of the present disclosure may be better and more fully understood:

FIG. 2 presents a sample direct power source process variable graph of the present disclosure;

FIG. 2A presents a sample inverse power source process variable graph of the present disclosure;

FIG. 3 presents a sample actuation force graph of the present disclosure;

FIG. 4 presents a sample computer-implemented method, using a direct power source process variable, of the present disclosure; and FIG. 4A presents a sample computer-implemented method, modified for an inverse power source process variable, of the present disclosure.

DETAILED DESCRIPTION OF SOME EMBODIMENTS

Figure 1:
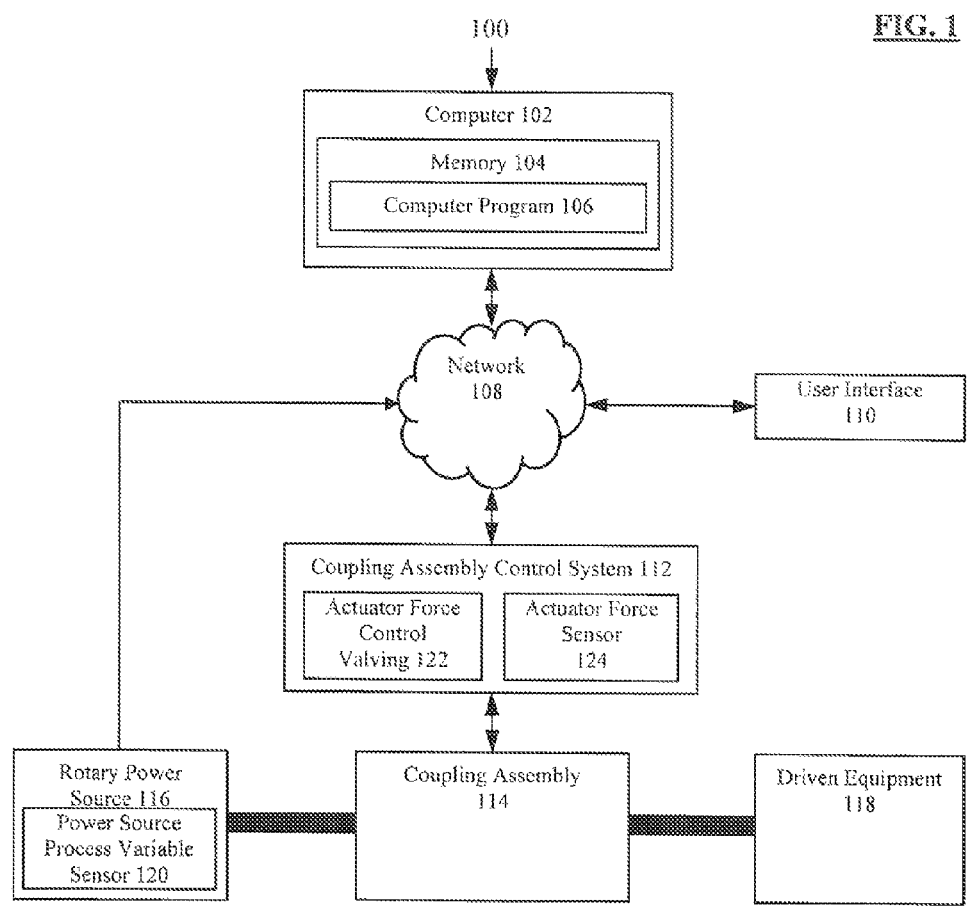
FIG. 1 presents a sample system of the present disclosure.

FIG. 1 presents a sample system 100 of the present disclosure, wherein the coupling assembly actuation force is provided by a pressurized fluid (any liquid or gas). The system 100 includes a computer 102, a memory 104, a computer program 106, a network 108, a user interface 110, and a coupling assembly control system 112, which may be referred to as a clutch control system 112. The computer program 106 is stored in the memory 104 and executed by the computer 102 to communicate with the user interface 110 and the coupling assembly control system 112 via the network 108. The coupling assembly control system 112 controls a coupling assembly 114, which may be referred to as the clutch assembly 114, and which can connect a rotary power source 116, which may be referred to as the engine 116, with driven equipment 118. The coupling assembly 114 includes a coupling, such as a clutch that may be a dry disc, a wet disc, a drum, or some other type of clutch. The rotary power source 116 includes a power source process variable sensor 120, which communicates a power source process variable via the network 108 or other means. The coupling assembly control system 112 employs signals to adjust the coupling assembly actuation force via actuator force control valving 122, which may be referred to as the clutch pressure control valving 122, and which may receive actuation force control commands via the network 108. The coupling assembly control system 112 also includes an actuator force sensor 124, which may be referred to as the clutch pressure sensor 124, which provides an output signal corresponding to the pressure applied to the coupling of the coupling assembly 114 via the actuator force control valving 122 and/or the network 108. Although FIG. 1 depicts one of each of the elements 102-124, the system 100 may include any number of each of the elements 102-124.

A rotary power source control system is connected to the rotary power source 116, a machine control system (valves and valve bodies) is connected to the driven equipment 118, and both of these systems 116-118 are connected to the coupling assembly 114. Operating data, such as a direct power source process variable(s) (such as torque, percent load, horsepower, throttle position, exhaust flow, watts, amperes, hertz, or other) or an inverse power source process variable(s) (such as speed in revolutions per minute, output clutch speed, input clutch speed, transmitted torque, volts, lead/lag phase angle, and manifold pressure), from the systems 112 and 116-118 is used to tailor the actuation force to the coupling assembly 114 and to minimize the time elapsed during coupling assembly slippage, by forcing the rotary power source 116 to develop a high power capability during coupling assembly engagement. A rotary power source governor reacts and increases the rotary power source power production capability, typically, by providing more fuel in an effort to maintain the idle speed. Rotary power source speed is, thus, an example of an inverse power source process variable, that is, as it decreases the rotary power source governor increases the rotary power source power production capability. Engine torque, throttle position, and fuel feed rate, perhaps expressed as percentages, are examples of direct power source process variables, that is, they increase as the rotary power source's power production capability increases. Until the coupling within coupling assembly 114 is fully engaged, the coupling assembly control system 112 allows the load-bearing surfaces of the coupling assembly 114 to adjust to optimal positions, thereby relieving mechanical forces.

The computer program 106 will not start the coupling assembly engagement process unless the rotary power source 116 is idling, for example between 600 and 1,200 revolutions per minute, or at a set percentage range of a base rotary power source speed measured during controller calibration. During the coupling assembly engagement process, an rotary power source speed excursion outside such a range does not terminate the coupling assembly engagement process. The computer 102 executes the computer program 106 in the memory 104 to increase a actuation force output to the coupling assembly control system 112 for the coupling assembly 114 that is interposed between the rotary power source 116 and the driven equipment 118. The increase in the actuation force output applies a light load to the rotary power source 116, causing the rotary power source 116 to bog (slow) down during the start of the coupling assembly engagement process. Although this example illustrates the use of the engine speed as the power source process variable, any operating data may be used as the power source process variable(s) to evaluate a stalling, bogging, slowing, sagging, or snorting of the rotary power source 116.

The computer program 106 determines whether the power source process variable sensor 120 indicates that a process variable of the rotary power source 116, such as the speed of the engine 116, drops below a power source process variable threshold, called a pause threshold. The pause threshold may be based on the rotary power source idle speed, such as 75% of the original engine idle speed for the engine 116. Examples of pause thresholds are described below in reference to FIG. 2 and FIG. 2A. If the power source process variable sensor 120 indicates that a process variable of the rotary power source 116, such as the speed of the engine 116, never drops below the power source process variable threshold, the computer program 106 increases the coupling assembly pressure output to the coupling assembly control system 112 for the coupling assembly 114 until the actuator force sensor 124 indicates that the coupling assembly pressure of the coupling assembly 114 rises to a force threshold, which may be the maximum operating clutch pressure.

If the power source process variable sensor 120 indicates that a process variable of the rotary power source 116, such as the speed of the engine 116, drops below the pause threshold, the rotary power source 116 may soon be on the verge of stalling, so the computer program 106 maintains, instead of increasing, the current actuation force output to the coupling assembly control system 112 for the coupling assembly 114. By stopping the increase in the actuation force output, the computer program 106 gives the rotary power source 116 the opportunity to recover from the increased load caused by the increased actuation force output. As the speed of the rotary power source 116 bogs or slows, its computer will increase the fuel flow, thereby increasing the rotary power source speed in an attempt to return the rotary power source 116 to idle speed. The rotary power source 116 remains in a power-producing state as it attempts to re-attain its idle speed.

The maximum potential of the rotary power source 116 is utilized throughout the entire coupling assembly engagement process. The rotary power source 116 changes from a low power-producing and unstable state at idle to a state where the rotary power source 116 must generate as much power as possible at its ever-changing operating speed. The rotary power source 116 is kept in the highest continuous power-producing state throughout the entire coupling assembly engagement process by increasing or maintaining the actuation force output to the coupling assembly control system 112 for the coupling assembly 114, which prevents the rotary power source 116 from immediately returning to its idle speed. The computer program 106 causes the exhaust flap and audible aspects of the coupling assembly engagement to react more gradually and uniformly than execution of the "bump starting" procedure.

If the power source process variable sensor 120 indicates that the rotary power source 116 is operating in an abnormal condition, such as dropping below a stall threshold, the computer program 106 decreases the actuation force output to the coupling assembly control system 112 for the coupling assembly 114 and disengages the coupling assembly 114 to prevent a stall. If the computer program 106 determines that the coupling assembly 114 is slipping in excess, the computer program 106 decreases the actuation force output to the coupling assembly control system 112 for the coupling assembly 114 and disengages the coupling assembly 114. If the computer program 106 decreases the actuation force output to the coupling assembly control system 112 for the coupling assembly 114 and disengages the coupling assembly 114, the operator must return the power switch for the coupling assembly control system 112 to the "OFF" position before the computer program 106 may reengage the coupling assembly 114 and increase the actuation force output to the coupling assembly control system 112 for the coupling assembly 114. The coupling assembly control system 112 will not automatically reengage the coupling assembly 114.

When maintaining the current actuation force output to the coupling assembly control system 112 for the coupling assembly 114, the computer program 106 determines whether the power source process variable sensor 120 indicates that the power source process variable rises above a resume threshold, which indicates a power demand decrease. The process variable of the rotary power source 116 rising above the resume threshold would indicate that the process variable of the rotary power source 116 is increasing, such that the rotary power source 116 is no longer in danger of stalling. If the power source process variable sensor 120 indicates that the process variable of the rotary power source 116, such as the speed of the engine 116, rises above the resume threshold, the computer program 106 increases the actuation force output to the coupling assembly control system 112 for the coupling assembly 114.

Because the computer program 106 either increases or maintains, without decreasing, the actuation force output to the coupling assembly control system 112 for the coupling assembly 114, the coupling assembly engagement may be referred to as "monotonically increasing" or simply "monotonic". Monotonic may simply mean not decreasing. Monotonically increasing the coupling assembly engagement actuation force is not necessarily increasing the actuation force engagement pressure, or necessarily maintaining the actuation force engagement pressure at a constant pressure, or necessarily increasing the actuation force pressure linearly. Monotonically increasing the coupling assembly engagement actuation force may include an initial step change in coupling assembly engagement actuation force, a constant coupling assembly engagement actuation force, slowly increasing the coupling assembly engagement actuation force, or rapidly increasing the coupling assembly engagement actuation force in response to the sagging of the rotary power sources' revolutions per minute. Monotonically increasing the coupling assembly engagement actuation force may result in a rate increase of the actuation pressure that is either linear or non-linear. Typically, the computer program 106 monotonically increases the actuation force output to the coupling assembly control system 112 for the coupling assembly 114 at a somewhat reduced rate. The coupling assembly engagement actuation force may increase either linearly or non-linearly with time.

After the computer program 106 determines that the power source process variable sensor 120 indicates that a process variable of the rotary power source 116, such as the speed of the engine 116, rises above the resume threshold, the computer program 106 continues to monitor the power source process variable sensor 120 only to prevent the rotary power source 116 from stalling, not to stop increasing the actuation force output to the coupling assembly control system 112 for the coupling assembly 114. At this point in time, the computer program 106 determines whether the actuation force sensor 124 indicates that the actuation force of the coupling assembly 114 rises to a force threshold, such as approximately at the maximum operating clutch pressure, which indicates full actuation engagement, is reached. If the actuator force sensor 124 indicates that the actuation force of the coupling assembly 114 does not rise to the force threshold, the computer program 106 gradually increases the actuation force output to the coupling assembly control system 112 for the coupling assembly 114 until the actuator force sensor 124 indicates that the actuation force of the coupling assembly 114 rises to the force threshold. The gradual increase in the actuation force output to the coupling assembly control system 112 for the coupling assembly 114 may be at an accelerated rate relative to the previous reduced rate of increase. The gradual increase in the actuation force output to the coupling assembly control system 112 for the coupling assembly 114 may be refined through a proportional, integral, or differential control of the power source process variable(s).

During this increase of the actuation force output, the computer program 106 may determine that the driven equipment 118 is stopped up, or plugged, by exceeding the rotary power source capacity at idle. If the actuator force sensor 124 indicates a decrease in the actuation force of the coupling assembly 114, the computer program 106 disengages the coupling assembly 114. Embodiments of the present disclosure enable a coupling assembly engagement to be started without the erratic behavior and without the production of high amounts of energy wasted by the "bump starting" procedure.

FIG. 2 presents a sample direct power source process variable graph 200 of the present disclosure. The graph 200 includes a vertical "direct power source process variable" axis 202 and a horizontal "time" axis 204. The graph 200 also includes a "power source process variable" 206, a horizontal "pause threshold" 208, a horizontal "resume threshold" 210, and an "idle condition" state 212. The "resume threshold" 210 value may be the same or equal to the "pause threshold" 208 value. If equal, one threshold suffices.

In an initial interval, the computer program 106 increases the command output to the coupling assembly control system 112 at an initial rate, the actuation force of the coupling assembly 114 increases, the power production capability of the rotary power source 116 at the current rotary power source speed increases, and the direct power source process variable 206 as reported by the power source process variable sensor 120 increases, as indicated by the point 262. When the power source process variable sensor 120 reports that the power production capability of the rotary power source 116 has risen above the pause threshold 208, as indicated by the point 252, the computer program 106 increases the command output to the coupling assembly control system 112 at a pause rate. The actuation force of the coupling assembly 114 is maintained or increases at a reduced rate and the power production capability of the rotary power source 116 decreases. Accordingly, the direct power source process variable 206 as reported by the power source process variable sensor 120 decreases, first below the pause threshold 208, as indicated by the point 274, then below the resume threshold 210, as indicated by the point 272, whereupon the computer program 106 increases the command output to the coupling assembly control system 112 at a resume rate. The actuation force of the coupling assembly 114 increases at a greater rate, the power production capability of the rotary power source 116 increases, and the direct power source process variable 206 as reported by the power source process variable sensor 120 increases, first above the resume threshold 210, as indicated by the point 274, then again above the pause threshold 208, as again indicated by point 252. After one or several such typical sequences, the actuation force and the resulting coupling assembly torque capability of the coupling assembly 114 exceeds the power production capability of the rotary power source 116 at the current rotary power source speed, as reported by the power source process variable sensor 120, as indicated by the point 242. The coupling assembly 114 is "locked up", not slipping, and the rotary power source 116 and the driven equipment 118 turn at the same speed. The computer program 106 increases the command output to the coupling assembly control system 112 to the full actuation force of the coupling assembly 114. The power production capability of rotary power source 116 continues to decrease at the current speed and the direct power source process variable 206 as reported by the power source process variable sensor 120 decreases to near the initial idle condition value, as indicated by point 280. The engagement process ends.

FIG. 2A presents a sample inverse power source process variable graph 200A of the present disclosure. The graph 200A includes a vertical "inverse power source process variable" axis 202A and a horizontal "time" axis 204A. The graph 200A also includes an "inverse power source process variable" 206A, a horizontal "pause threshold" 208A, a horizontal "resume threshold" 210A, and a horizontal "idle condition" state 212A. It is readily apparent by comparing the graph 200A with the graph 200 that, as the rotary power source 116 power production capability increases, the inverse power source process variable 206A, as reported by power source process variable sensor 120, decreases. In other ways, the behavior of the monotonic coupling assembly engagement is the same with direct and inverse process variables.

FIG. 3 presents a sample coupling assembly actuation force graph 300 of the present disclosure. The graph 300 includes a vertical "coupling assembly actuation force" axis 302, or a vertical "clutch actuation force" axis 302, and a horizontal "time" axis 304. The graph 300 also includes a "coupling assembly actuation force" 306, or a "clutch action force" 306, a horizontal "force threshold" 308 and a horizontal "full actuation force" state 310.

In an initial interval, the computer program 106 increases the command output to the coupling assembly control system 112 at an initial rate, the coupling assembly actuation force 306 of the coupling assembly 114 increases, the power production capability of rotary power source 116 at the current rotary power source speed increases, and the direct power source process variable as reported by power source process variable sensor 120 increases, as indicated by the point 362. When the power source process variable sensor 120 reports that the power production capability of the rotary power source 116 has risen above the pause threshold 208, as indicated by the point 252, both depicted in FIG. 2, the computer program 106 increases the command output to the coupling assembly control system 112 at a pause rate. The coupling assembly actuation force 306 of the coupling assembly 114 is maintained or increases at a reduced rate as indicated by points 352 and 374 and the power production capability of the rotary power source 116 decreases.

Accordingly, the direct power source process variable as reported by power source process variable sensor 120 decreases, first below the pause threshold 208, as indicated by the point 274, then below a resume threshold 210, as indicated by the point 272, all depicted in FIG. 2, whereupon the computer program 106 increases the command output to the coupling assembly control system 112 at a resume rate. The actuation force of the coupling assembly 114 increases at a greater rate as indicated by points 372 and 374, the power production capability of the rotary power source 116 increases, and the direct power source process variable as reported by the power source process variable sensor 120 increases, first above the resume threshold 210, as indicated by the point 274, then again above the pause threshold 208, as again indicated by point 252, all depicted in FIG. 2.

After one or several such typical sequences, the clutch actuation force 306 and the resulting coupling assembly torque capability of the coupling assembly 114 exceeds the power production capability of the rotary power source 116 at the current rotary power source speed, as indicated by the point 342 and as reported by the power source process variable sensor 120, as indicated by the point 242, as depicted in FIG. 2. The coupling assembly 114 is "locked up", not slipping, and the rotary power source 116 and the driven equipment 118 turn at the same speed. The computer program 106 increases the command output to the coupling assembly control system 112 to the full actuation force of coupling assembly 114 as indicated by the point 380. The power production capability of rotary power source 116 continues to decrease at the current speed and the direct power source process variable as reported by the power source process variable sensor 120 decreases to near the initial idle condition value, as indicated by the point 280, as depicted in FIG. 2. The engagement process ends.

FIG. 4 presents a sample computer-implemented method 400, using a direct power source process variable 206, of the present disclosure. The system 100 may execute the computer-implemented method 400 to engage a coupling assembly 114 without erratic behavior of the rotary power source 116 and without dissipating large amounts of energy in the coupling assembly 114 by the "bump starting" procedure. Following the operator-initiated "start" block 400, the method 400 initializes the engagement process in block 410, for example by calibrating the coupling assembly control system 112 and clearing the current engagement process status.

The current status of the engagement process is indicated in block 420 and a determination is made in block 430 whether the status of the engagement process is normal. If the status of the engagement process is not normal, the method 400 proceeds to block 432, disengages the coupling assembly 114, or the clutch assembly 114, by, for example, setting the coupling assembly actuation force 306 to a zero value, and immediately ends the engagement process in block 480.

If the status of the engagement process is determined to be normal in block 430, the method 400 determines whether the coupling assembly actuation force 306, or the clutch actuation force 306, is below a force threshold 308 in block 440 and, if it is not, increases the coupling assembly actuation force 306, or the clutch actuation force 306, to the full coupling assembly actuation force 310 in block 442 and ends the engagement process in block 480 with a fully engaged coupling assembly 114.

If the coupling assembly actuation force 306 is determined to be below the force threshold 308 in block 440, the method 400 determines whether the direct power source process variable 206, or the engine process variable 206, is above the pause threshold 208 in block 450 and, if it is, increases the coupling assembly actuation force 306, or the clutch actuation force 306, according to the pause rate in block 452. This also ends the initial interval 262 and 362, in which the coupling assembly 114 is brought into tentative engagement and first increases the power production capability of the rotary power source 116.

If the direct power source process variable 206 is determined to not be above the pause threshold 208 in block 450, the method 400 determines whether the initial interval 262 and 362, in which the coupling assembly 114 is brought into tentative engagement, is complete in block 460 and, if it is not, increases the coupling assembly actuation force 306, or the clutch actuation force 306, at the initial rate in block 462.

If the initial interval 262 and 362 is determined to be complete in block 460, the method 400 determines whether the direct power source process variable 206, or the direct engine process variable 206, is below the resume threshold 210 and, if it is, increases the coupling assembly actuation force 306, or the clutch actuation force 306, at the resume rate in block 472.

If the direct power source process variable 206 is determined to not be above the resume threshold 210 in block 470, the method 400 increases the coupling assembly actuation force 306, or the clutch actuation force 306, at the current rate, be it the initial, the pause, or the resume rate, in block 474.

Having increased the coupling assembly actuation force 306 at the initial, pause, or resume rates in blocks 452, 462, 472, or 474, the method 400 returns to indicate the engagement process status in block 420.

FIG. 4A presents a sample computer-implemented method 400A, using an inverse power source process variable 206A, of the present disclosure. Block 450A determines whether the inverse power source process variable 206A is below the pause threshold 208A. Block 470A determines whether the inverse power source process variable 206A is above the resume threshold 210A. In other ways, the method 400A follows the method 400.

Accordingly, a system, computer program product, and computer-implemented method are provided for a monotonic coupling assembly engagement. The system 100 starts a coupling assembly engagement process without the erratic behavior and without the production of high amounts of energy wasted by the "bump starting" procedure.

The systems, computer-implemented methods, and computer program products in the embodiments described above are exemplary. Therefore, many details are neither shown nor described. Even though numerous characteristics of the embodiments of the present disclosure have been set forth in the foregoing description, together with details of the structure and function of the present disclosure, the present disclosure is illustrative, such that changes may be made in the detail, especially in matters of shape, size and arrangement of the components within the principles of the present disclosure to the full extent indicated by the broad general meaning of the terms used in the attached claims. The description and drawings of the specific examples above do not point out what an infringement of this patent would be, but are to provide at least one explanation of how to make and use the present disclosure. The limits of the embodiments of the present disclosure and the bounds of the patent protection are measured by and defined in the following claims.

The invention claimed is:

1. A system for a monotonic coupling assembly engagement, the system comprising:
   a computer;
   a memory;
   a user interface; and
   a computer program stored in the memory and executed by the computer to:
   increase a coupling assembly actuation force output to a coupling assembly associated with a rotary power source and a piece of driven equipment;
   determine whether a power source process variable associated with the rotary power source drops below a pause threshold;
   maintain a current coupling assembly actuation force output to the coupling assembly in response to a determination that the power source process variable drops below the pause threshold;
   determine whether the power source process variable rises above a resume threshold; and
   increase the coupling assembly actuation force output to the coupling assembly in response to a determination that the power source process variable rises above the resume threshold.

2. The system as in claim 1, wherein increasing the coupling assembly actuation force output to the coupling assembly comprises increasing the coupling assembly actuation force output to an actuator force control valving associated with the coupling assembly.

3. The system as in claim 1, wherein the power source process variable is received from a power source process variable sensor associated with the rotary power source.

4. The system as in claim 1, wherein the pause threshold is based on an original rotary power source idle speed associated with the rotary power source.

5. The system as in claim 1, wherein the resume threshold is based on an original engine idle speed associated with the rotary power source.

6. The system as in claim 1, wherein the computer program monotonically increases the coupling assembly actuation force output to the coupling assembly.

7. A computer-implemented method for a monotonic coupling assembly engagement, the computer-implemented method comprising the steps of:
   increasing, at an initial rate, a coupling assembly actuation force output to a coupling assembly associated with a rotary power source and a piece of driven equipment;
   determining whether a direct power source process variable associated with the rotary power source increases above a pause threshold;
   increasing, at a reduced rate from the initial rate, the coupling assembly actuation force output to the coupling assembly in response to a determination that the direct power source process variable increases above the pause threshold;
   determining whether the direct power source process variable decreases below a resume threshold;
   increasing, at a resume rate, the coupling assembly actuation force output to the coupling assembly in response to a determination that the direct power source process variable decreases below the resume threshold;
   determining whether a coupling assembly pressure associated with the coupling assembly increases above a force threshold; and
   increasing the coupling assembly actuation force output to the coupling assembly in response to a determination that the coupling assembly pressure does not increase above the force threshold.

8. The computer-implemented method as in claim 7, wherein increasing the coupling assembly actuation force output to the coupling assembly comprises increasing the coupling assembly actuation force output to an actuator force control valving associated with the coupling assembly.

9. The computer-implemented method as in claim 7, wherein the direct power source process variable is received from a power source process variable sensor associated with the rotary power source.

10. The computer-implemented method as in claim 7, wherein at least one of the pause threshold and the resume threshold is based on an original rotary power source idle speed associated with the rotary power source.

11. The computer-implemented method as in claim 7, wherein the force threshold is based on an actuator force sensor associated with the coupling assembly.

12. The computer-implemented method as in claim 7, wherein the coupling assembly pressure is received from an actuator force sensor associated with the coupling assembly.

13. A computer-implemented method for a monotonic coupling assembly engagement, the computer-implemented method comprising the steps of:
- increasing, at an initial rate, a coupling assembly actuation force output to a coupling assembly associated with a rotary power source and a piece of driven equipment;
- determining whether an inverse power source process variable associated with the rotary power source decreases below a pause threshold;
- increasing, at a rate reduced from the initial rate, the coupling assembly actuation force output to the coupling assembly in response to a determination that the inverse power source process variable decreases below the pause threshold;
- determining whether the inverse power source process variable increases above a resume threshold;
- increasing, at a resume rate, the coupling assembly actuation force output to the coupling assembly in response to a determination that the inverse power source process variable increases above the resume threshold;
- determining whether a coupling assembly pressure associated with the coupling assembly increases above a force threshold; and
- increasing the coupling assembly actuation force output to the coupling assembly in response to a determination that the coupling assembly pressure does not increase above the force threshold.

14. A non-transitory computer program product for a monotonic coupling assembly engagement, the computer program product comprising:
- a computer readable storage medium storing computer executable program code that, when executed by a processor, causes the computer executable program code to perform a method comprising the steps of:
  - increasing a coupling assembly actuation force output to a coupling assembly associated with a rotary power source and a piece of driven equipment;
  - determining whether a power source process variable associated with the rotary power source rises above a pause threshold;
  - maintaining a current coupling assembly actuation force output to the coupling assembly in response to a determination that the power source process variable rises above the pause threshold;
  - determining whether the power source process variable decreases below a resume threshold;
  - increasing the coupling assembly actuation force output to the coupling assembly in response to a determination that the power source process variable decreases below the resume threshold;
  - determining whether a coupling assembly pressure associated with the coupling assembly rises above a force threshold; and
  - increasing the coupling assembly actuation force output to the coupling assembly in response to a determination that the coupling assembly pressure does not rise above the force threshold.

15. The non-transitory computer program product as in claim 14, wherein increasing the coupling assembly actuation force output to the coupling assembly comprises increasing the coupling assembly actuation force output to an actuator force control valving associated with the coupling assembly.

16. The non-transitory computer program product as in claim 14, wherein the power source process variable is received from a power source process variable sensor associated with the rotary power source.

17. The non-transitory A computer program product as in claim 14, wherein the pause threshold is based on an original rotary power source idle speed associated with the rotary power source.

18. The non-transitory computer program product as in claim 14, wherein the force threshold is based on a maximum coupling assembly pressure.

19. The non-transitory computer program product as in claim 14, wherein the coupling assembly pressure is received from an actuator force sensor associated with the coupling assembly.

20. The non-transitory computer program product as in claim 14, wherein the resume threshold is based on an original rotary power source idle speed associated with the rotary power source.

* * * * *